June 15, 1971  KATASHI AOKI  3,584,337

INJECTION BLOW MOLDING DEVICE

Filed Dec. 27, 1967  7 Sheets-Sheet 1

INVENTOR.
KATASHI AOKI
BY
Semmes and Semmes

United States Patent Office 3,584,337
Patented June 15, 1971

3,584,337
INJECTION BLOW MOLDING DEVICE
Katashi Aoki, 6037 Oaza Nanjo, Sakaki-machi,
Hanishina-gun, Nagano-ken, Japan
Filed Dec. 27, 1967, Ser. No. 693,994
Claims priority, application Japan, Dec. 28, 1966,
42/85,408; Dec. 30, 1966, 42/85,833
Int. Cl. B29c 5/06
U.S. Cl. 18—5                                    5 Claims

ABSTRACT OF THE DISCLOSURE

Injection molding apparatus, particularly a nozzle and runner gate configuration eliminating the necessity for plural sets of molds and multi-head nozzles in molding a variety of bottle configurations.

Present invention relates to an injection blow molding.

BACKGROUND OF THE INVENTION

Injection Molding Method for Making Shoes, Ser. 543,505, filed Mar. 30, 1966, now Pat. No. 3,429,007, dated Feb. 25, 1969.

Mold Closing Apparatus for an Injection Molding Machine, Ser. 669,575, filed Sept. 21, 1965.

The kinds of processes of the injection blow molding are as follows:

(A) Closing a metal mold and injection-molding bottomed cylinders.

(B) Opening the metal mold and transferring the molded, bottomed cylinder into a bottle-shaped female mold.

(C) Closing the metal mold and introducing compressed air into the bottom cylinder so as to form the material into the bottle shape by bulging.

(D) Opening the metal mold and release the molded article from the mold.

The inventor, after studying how to carry out the above-mentioned processes efficiently and economically, has completed the present invention with the following advantages, namely, (1) The four processes of opening and closing operations of said metal mold are simplified into two processes.

(2) In order to carry out the molding efficiently, it is made possible to provide a number of metal molds so that the corresponding numbers of molding can be effected simultaneously. That is, in conventional devices, a multiple injection molding was effected by means of a multi-head nozzle or of hot runner, in which there is a considerable number of technical difficulties such as problems on leakage between multi-head nozzle and metal mold, heat preservation of hot runner and heat insulation of cavity, etc.

With the present invention, however, the above-said technical difficulties are eliminated by using a simple nozzle, and also by using a runner gate similar to that of the ordinary injection mold, thus a number of articles may be produced simultaneously.

(3) With regard to the shape of the bottle being molded, there are various kind such as bottles with bulged bottom, or having gourd-shapes, etc., so that it will be convenient if the contour of the bottomed cylinder initially molded were similar thereto, but when the machine is designed to withdraw the molded article together with male mold from the female mold to be injection-molded, this is impossible and inexpedient. In the present invention, by using a split-mold, such an injection molding is made possible even when the gourd-shaped contour of the article is required.

Furthermore, a uniform thickness may be maintained by simultaneous releasing of metal mold (female molds), eliminating the temperature difference at the wall surfaces of the bottomed cylinder, preventing uneven thickness of the molded articles, so as to get uniform products.

(4) The metal molds are of the simplest possible design, and so contrived as to be able to serve with one set only. The setting of metal molds on the machine is made as easy as possible.

All these points are achieved generally with the present invention, thus it is said to be very effective, having a function and effect which could never be expected with the mechanisms heretofore prevailed.

The invention will now be described with each of the embodimental examples referring to the drawings, wherein FIGS. 1 through 5 show the first example of the device according to the present invention, and in which.

FIGS. 6 through 9 show the second embodimental example of the device according to the present invention, and in which

FGS. 10 and 11 show the third embodimental example, and in which

FG. 10 is a transverse sectional plan view of the device similar to FIG. 1;

In FIGS. 1 through 5, the numeral 1 and 2 designate separable female molds which open and close uniformly to right and left with the engaging surface of the metal molds as the boundary, and being secured on mounting plates 3 and 4 respectively. Opening and closing, and tightening of the separable female molds are effected by means of a pair of rams 7, 8 inserted in a cylinder block 6 fixed on machine bed 5. As shown in the drawing, a pair of rams 7, 8 are opposedly and slidably provided on both ends of the cylinder block 6, and on one of the ram 7 is fixed a mold mounting plate 3 having a separable female mold 1 through washer plate 9, while on the other ram 8, an actuating plate 11 is engageably provided through a washer plate 10. The actuating plate 11 and the mold mounting plate 4 having the separable female mold 2 are connected by drawing shafts 12, 12 passing through the mold mounting plate 3. The numeral 13 designates lock nuts at both ends of the shafts. In the cylinder block 6 is accommodated a threaded rod 16 which has righthand lefthand screw portions 14 and 15. The threaded rod is engaged into the female screw hole of said ram, inserting a bearing 17 at the central base portion of the rod, and fixing the bearing to the cylinder block 6. By applying oil pressure or admitting other fluid under pressure into the cylinder block 6, the end surfaces of the ram are pressed uniformly causing the self rotation of the threaded rod 16, and utilizing the torque thereof, shifting (separating, bringing near) relatively both of rams 7, 8 smoothly and at equal speed to open and close the mold mounting plates 3, 4, and with them, the separable female molds 1, 2 uniformly at equal speed thus effecting the tightening and opening of the molds. The numeral 18 shows guide bases arranged on the bed 5, which serve to hold the mold mounting plates 3, 4 and the actuating plate 11 slidably thereon for a desired stroke.

A plurality of male molds 19, 19 corresponding to said female separable molds 1, 2 are disposed in vertical direction on both sides of male mold mounting base 20 interposed at the central portion of separable female molds 1, 2. The male molds 19, 19 are provided symmetrically on both sides of said mounting base 20, each inserted into a plurality of cavities provided in the separable molds 1, 2 respectively. The separable female molds 1, 2 are internally provided with a number of injection molding cavities for bottomed cylinder 21 on the side of the injection nozzle, and the same number of blowing cavities 22 are internally provided at equal distance on the opposite side of the nozzle. The male moldes 19, 19 are each internally provided with air blowing hole with a valve.

The shaft 23 of the male mounting base 20 which rotates with the male molds 19, 19 in parallel with parting surface of the separable female molds 1, 2 is inserted rotatably into a through hole 24 provided centrally in one of the separable female mold 1, while on the side of the separable female mold 2, a rotating shaft 25 is detachably connected to the male mold counting base 20, holding said base rotatably. The rotating shaft 25 passes through central holes provided in the separable female mold 2 and the female mounting plate 4 respectively. A pinion 26 provided on the periphery of the shaft situated outward of the mold mounting plate 4 is engaged with a rack 28 provided on a piston 27 operated by oil pressure. A pair of ventilating ducts 29, 29, is provided inside of the rotating shaft for supplying air from an air compressor (not shown) to the male molds 19, 19 through the male mold mounting base 20, the air from the compressor is passed only to the male mold group at the side of the blowing cavity 22 where it is required for expansion of the bottomed cylinder 30, blowing off, etc.

Next, the end portion of the rotating shaft 25 on which is provided the pinion 29, is journalled on an adjustable base 31, which is transferable axially, said adjustable base is mounted on supporting base 32 provided on the machine bed 5, the legs of the adjustable base are slidably engaged with the guide rails 33, a threaded rod 35 with handle is screwed perpendicular to a block 34 suspendedly provided just below the adjustable base 31. Thus when the metal mold is set onto the machine, the adjustable base 31, and therefore the rotating shaft 25 are shifted towards the center of the axis due to the rotation of said threaded rod, thus the adjustment necessary for the thickness of the molds may be effected, and in this manner the male molds 19, 19 are adjusted to set them at a correct position against the separable female molds 1, 2. After the setting of the metal molds, the male molds are fixed to the adjustable base 31 so that the molds will not shift in axial direction although the rotating shaft 25 may rotate.

The rotating shaft 25 is so arranged that it rotates exactly 180° right and left by the engagement of the pinion 26 of said shaft and the rack 28 of the piston 27, said piston effecting a reciprocating motion actuated by oil pressure also in some case by pneumatic pressure in the cylinder 36. The rotation of the rotating shaft is effected also by a prime mover such as electric motors in place of the hydraulic piston.

The injection heating cylinder 37 and the injecting nozzle are disposed at rectilinear position on the parting line of the separable female molds 1, 2, and the injection nozzle bears against the side surfaces of the female molds 1, 2 on the parting line. To withstand the pressure, the female molds and the mold opening mechanism are connected by the drawing shafts 12, 12 as described above, and are secured firmly by actuating plate 11 and the mold mounting plates 3, 4 mounted on the guide base 18.

The numeral 38 designates a remover for removing sprue and runner 39 from the bottomed cylinder 30 which is injection-molded, and is arranged on the mold mounting plate 3 with the female mold 1, and is comprised of a hollow tube facing the sprue, a washer for receiving the coiled spring and a push rod. When resinous substance 3 of the sprue and runner adheres and separates at the tip end of the hollow tube at the opening of the mold, the push rod, simultaneously therewith abuts a pin 40 (stroke adjustable) protrudedly provided at one side of the cylinder block 6, moving forward against the coiled spring, and consequently the resinous substances of the sprue, runner adhered on the tip end of the hollow tube is removed.

Now the molding process in the above-mentioned device will be described. First, an oil pressure is applied on the end surfaces of rams 7, 8 in the cylinder block 6. The threaded rod 16 rotates by itself due to the effect of rams movable by oil pressure, and the rams move forwardly and leave off with each other with the threaded lever as a guide. One of the rams 7 presses the mold mounting plate 3, while the other ram presses the actuating plate 11 respectively. The actuating plate draws the mold mounting plate 4 toward the male mold by means of the drawing shafts 12, 12, clamping the forwarded separable female mold 1 and the male molds 19, 19 to face with each other by the mold mounting plate 3 so as to effect closing of the molds, and pressing the injection nozzle on the lateral surface of the female mold (nozzle touch) on the parting line. The injecting material is then injected into the molding cavity 21 through the sprue, the runner and the gate, thus a bottomed cylinder 30 is molded. Next, the separable male molds 1, 2 are opened, and actuating the piston 27 of the cylinder 36, causing the shaft 25 to rotate for 180° by engagement of the rack 28 and pinion 26, removing resinous substance from the sprue, runner and gate portions with the remover 38, transferring the male mold 19 together with the bottomed cylinder to the side of blowing cavity 22, and tightening the separable female molds 1, 2. Then injecting material is injected into the molding cavity 21 to mold a bottomed cylinder, and at the same time feeding a compressed air into the male mold 19 from the air compressor through the through hole 29 in the rotating shaft 25 and the male mold mounting base, blowing the compressed air through the valve into the bottomed cylinder, bulging it into a bottle-shaped hollow molded article 30a. Then, on opening the mold, the hollow molded article 30a separates and falls from the male mold by the pressure of compressed air, thus the first molding operation is terminated. From the second operation on, the molding of the bottomed cylinder by injection of the injection material and the blowing (blowing of and bulging by compressed air) of the bottomed cylinder are effected simultaneously, and the hollow molded articles are produced successively and continuously.

In the device just described, the tightening and opening of the separable female mold is effected synchronously by means of a pair of rams 7, 8 in the cylinder block 6 and the threaded rod 16, but in another example shown in FIGS. 6 through 9, the opening of the separable female mold is effected by a crack arm operable through the mold mounting plate connected with the ram. In the explanation, the same references are used for showing the similar parts as used in the first example.

In this device, one of the mold mounting plates 3 is mounted on the end of the ram 41 provided in cylinder block 6 fixed on machine bed 5 through a washer, and a pair of tie rods 42, 42 is fixedly provided between the cylinder block 6 and the other fixed mold mounting plate 4 through the mold mounting plate 3, said mold mounting plate 3 is adapted to be slidable forwardly and backwardly guided by the tie rods 42, 42 by means of the reciprocating motion of the ram 41.

The separable female molds 1, 2 fixed on the oppesedly provided mold mounting plates 3, 4 have a cavity 21 for injection molding and a cavity 22 for blowing, and the mold mounting base 20 projectingly provided with a plurality of male molds 19, 19 is mounted on the rotatable shaft 25 so that it is rotatable together with the male molds 19, 19 in a plane parallel with the parting line of the separable female molds 1, 2.

Next, the outer end portion of the rotating shaft 25 is supported on the adjustable base 31 which is transferable in the axial direction, said adjustable base being mounted on a transfer base 43 slidable on supporting base 32 fixedly provided on the machine base 5. The supporting base 32 and transfer base 43 are each provided with guide rails, to which legs of the transfer base and the adjustable base engage slidably. A threaded rod 35 with handle is connected perpendicular to the block 44 suspendedly provided directly below the adjustable base 31. When the metal molds are to set on the machine, the adjustable base 31, and therefore the rotating shaft 25 are shifted in axial direction by rotation of the threaded rod, thus by adjusting the set position of the male molds 19, 19 correctly with respect to the separable female molds 1, 2 according to the thickness of the mold, the adjustable base 31 is securely positioned on the transfer base 43.

On the other hand, the transfer base 43 causes the rotating shaft 25 to shift in the axial direction, which causes male molds 19, 19 to separate from the female mold 1, and this shifting is effected in synchronism with the shifting of the female mold 2. Thus, the reciprocating motion of the mold mounting plate 3 is transmitted to the transfer base 44 by means of a crank arm 45 connected to one side of the mold mounting plate 3 of the female mold 2 and a crank arm 46 jointed with said crank arm 45. The crank arm 46 has a supporting shaft 47 as a supporting point, and has an engaging hole 48 at the center of the arm, in which an engaging shaft suspended from the transfer base is inserted loosely, and is jointed with the crank arm 45. When the arm 45 is pushed or pulled by the mold mounting plate 3, the arm 46 pushes or pulls the engaging shaft of the transfer base through a crank motion. In this way the transfer base moves the rotating shaft 25 forwardy or backwardly in the axial direction together with the adjustable base 31, the piston 27 connected therewith, etc., thus the separation and fitting of the male molds 19, 19 are effected. The shifting stroke of the male mold is about the half that of the female mold 2, so that no obstruction ever occurs for rotation of the male mold or taking-off of the molded articles.

Now the molding process of this example will be described. When an oil pressure is applied on the bottom portion of the ram 41 in the cylinder block 6, the mold mounting plate 3 is pushed, the forwarded separable female mold 2 faces with the fixed female mold 1 with the male molds 19, 19 placed therebetween to close the mold, the injection nozzle presses against the lateral surface of the female mold (nozzle touch) on the parting line. The injection material is injected from the injecting nozzle into the molding cavity 21 through the sprue, the runner and the gate, and an injected, bottomed cylinder 30 is formed. Then after a predetermined injection period is passed, oil pressure is released, contrary to the above-mentioned process, and the ram is retracted, then one of the separable female mold 1 shifts in opening direction together with the mold mounting plate 3, and at the same time, the crank arm 45 connected at the end portion of said mold mounting plate operates in drawing direction, and shifts the rotating shaft in axial direction for a certain distance through the crank arm 46 and the transfer base 43, and pushes the male mold mounting plate 20 to the center of the opened pair of the separable female molds 1, 2. When this operation is terminated, the piston 27 of the cylinder 36 is actuated to rotate the rotating shaft 25 for 180° by engagement of the rack 28 and pinion 29, removing resinous substance at the sprue, runner 39 and gate portions by means of a remover 38. Then removing the male mold 19 to the side of the blowing cavity 22 together with the bottomed cylinder 30, tightening the separable female molds 1, 2, supplying compressed air from the air compressor to the male mold 19 through the air duct of the male mold mounting plate and the rotating shaft, blowing the air from the valve onto the bottomed cylinder and bulging it into a bottle-shaped hollow molded article 30a. By opening of the mold, the hollow molded article 30a separates and falls out of male mold by the pressure of the compressed air, and the first molding process is terminated.

Figure 1:
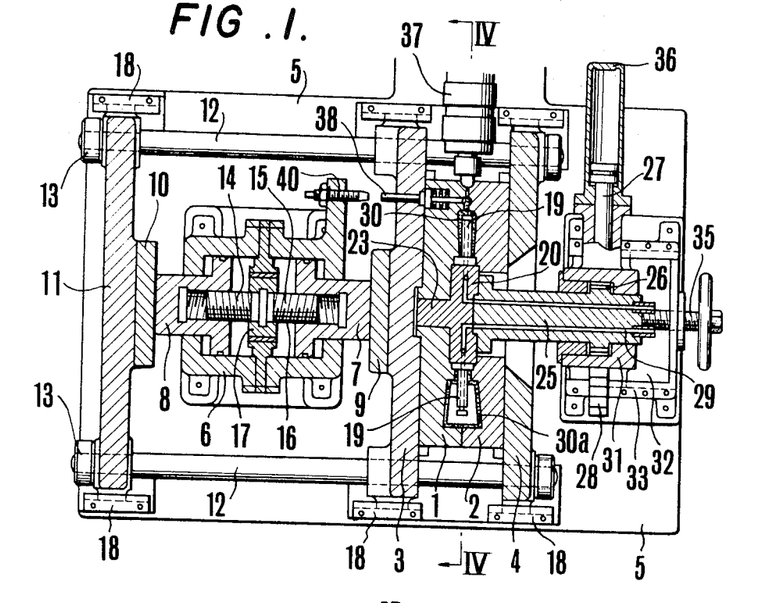
FIG. 1 is a device shown in a transverse sectional plan view wherein the injection and blow moldings of a synthetic resin material are effected simultaneously.
Figure 2:
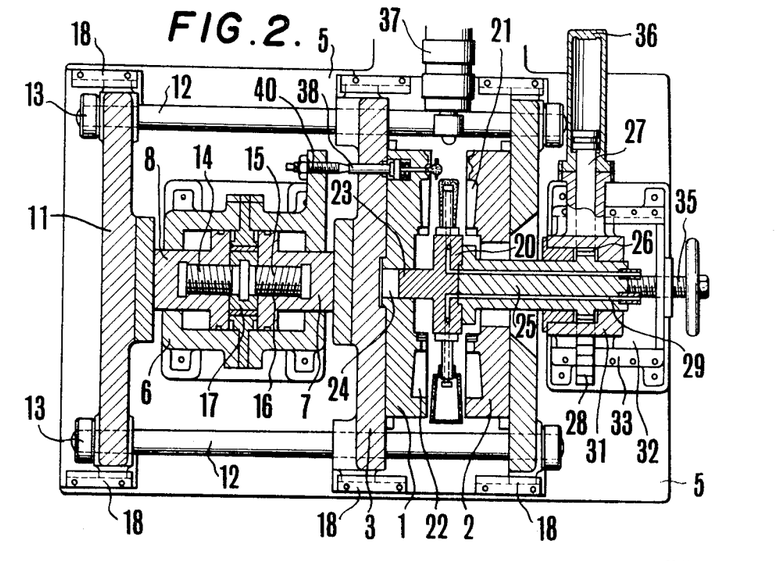
FIG. 2 shows a transverse sectional plan view of the device at the opening of mold.
Figure 3:
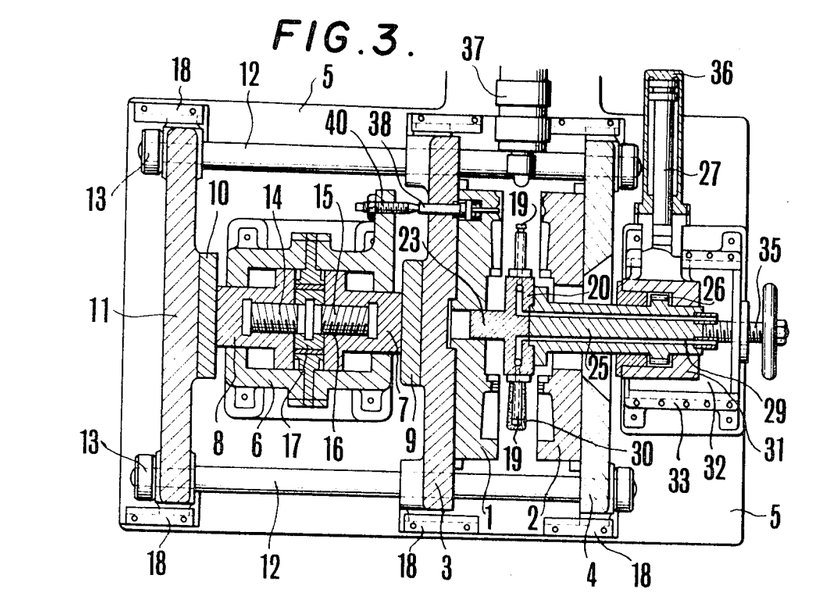
FIG. 3 shows a transverse sectional plan view of the device when the injection-molded, bottomed cylinder is rotated and positioned at the cavity for blowing.
Figure 4:
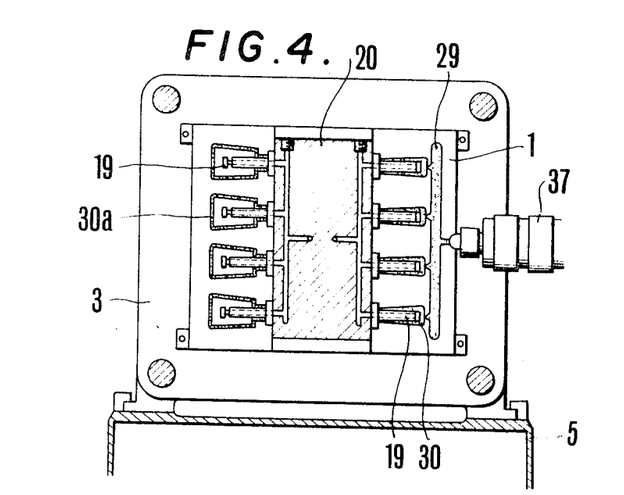
FIG. 4 is a longitudinal sectional view along the line IV—IV in FIG. 1.
Figure 5:
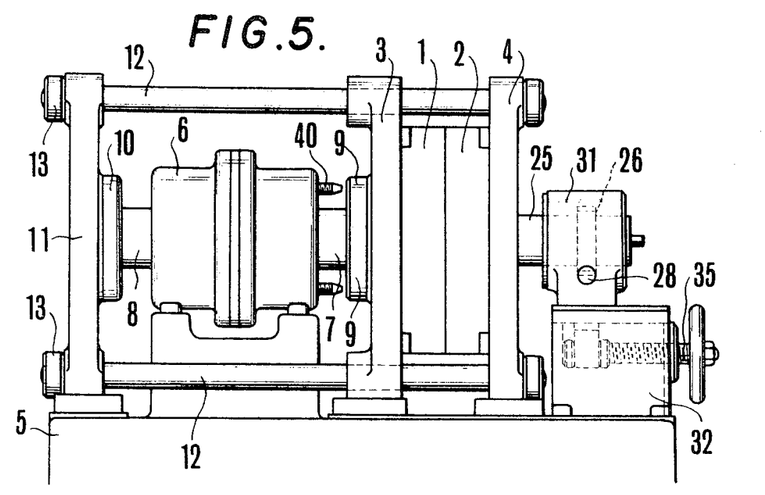
FIG. 5 shows a general side elevation of the whole device.
Figure 6:
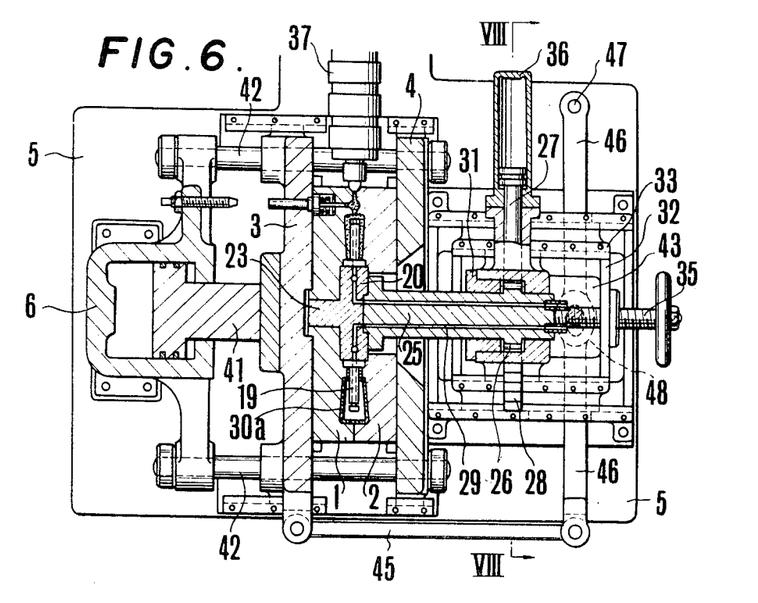
FIG. 6 shows a transverse cross-sectional plan similar to that of FIG. 1.
Figure 7:
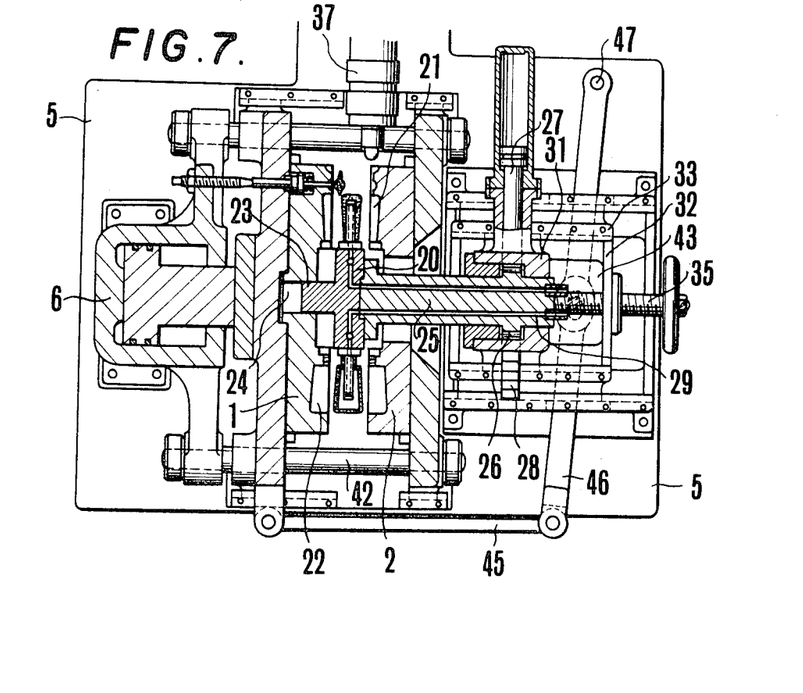
FIG. 7 is a transverse sectional plan view at the opening of the mold.
Figure 8:
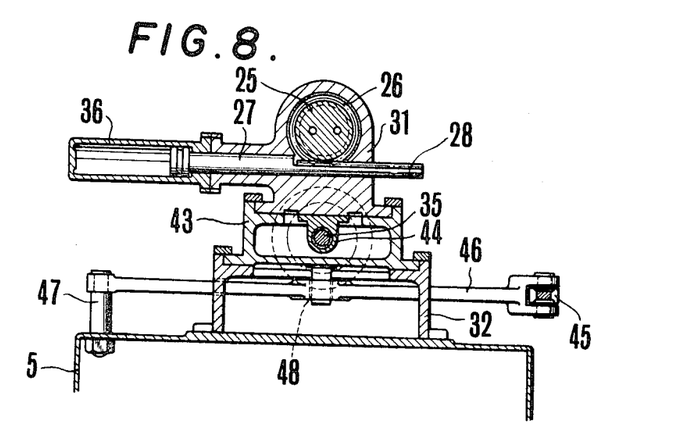
FIG. 8 is a transverse sectional view along the line VIII—VIII in FIG. 6.
Figure 9:
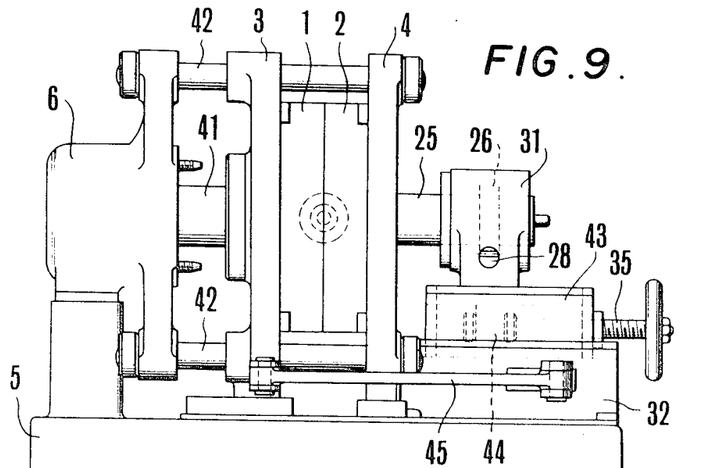
FIG. 9 is a general side elevation of the whole device.
Figure 10:
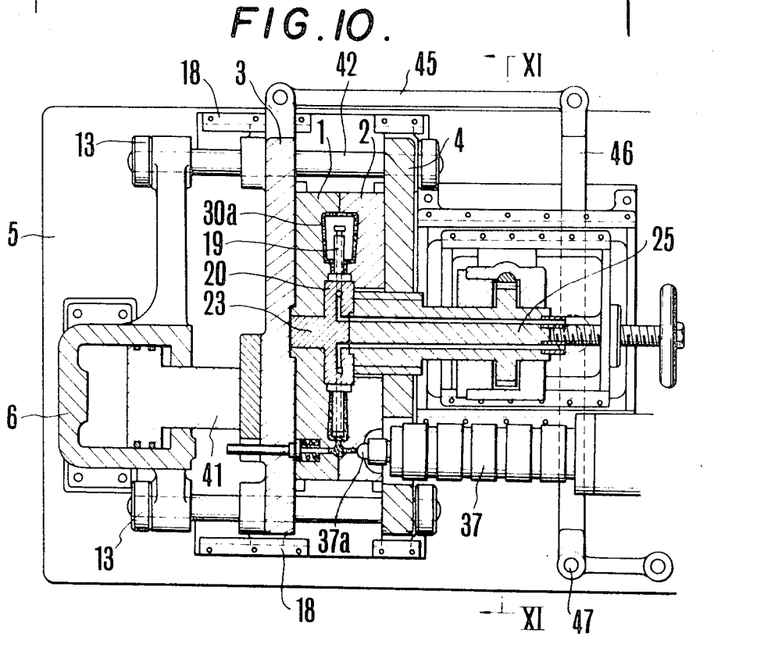
Figure 11:
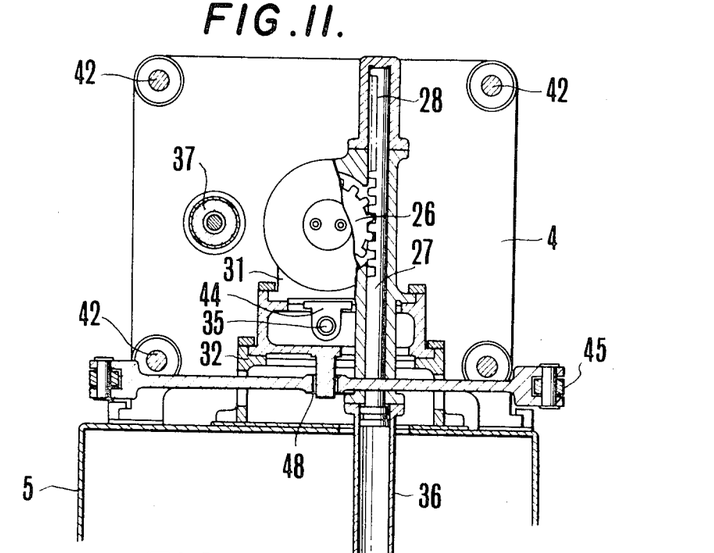
FIG. 11 is a longitudinal sectional view taken along the line XI—XI of FIG. 10.

In the third example of the device shown in FIGS. 10 and 11, an injection heating cylinder 37 is provided parallel to the rotating shaft 25 on the device described above as the second example of this kind. The nozzle 37a of the injection heating cylinder 37 is disposed at right angles to the parting line of a pair of separable female molds 1, 2, and the cylinder block 6 and the ram 41 which open and close the mold mounting plate 3 directly, are arranged between the injection heating cylinder 37 and the rotating shaft 25. The rack 28 which rotates the rotating shaft 25, the piston 27 of the rack, and the oil pressure cylinder 36 are arranged longitudinally as shown in FIG. 11, as the injection heating cylinder 37 situates at the side of the adjustable base 31. Therefore, in this device, the injection heating cylinder 37 is arranged above the machine base, and does not protrude from the machine as in the preceding two examples, so that no special machine base is required for the injection device including the injection heating cylinder, and all the device can be arranged compactly on one rectangular machine base.

Furthermore, since the ram is arranged only on one side of the injection nozzle, the pressure exerted at the injection is received fully by the ram, so that the opening of the separable female molds due to the injection pressure may be prevented.

Figure 12:
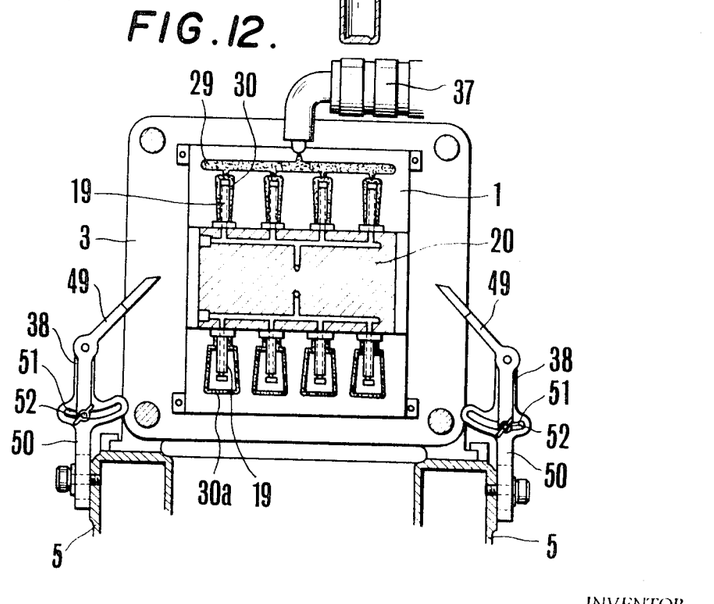
FIG. 12 is a longitudinal sectional view showing another embodimental example of the metal mold.
Figure 13:
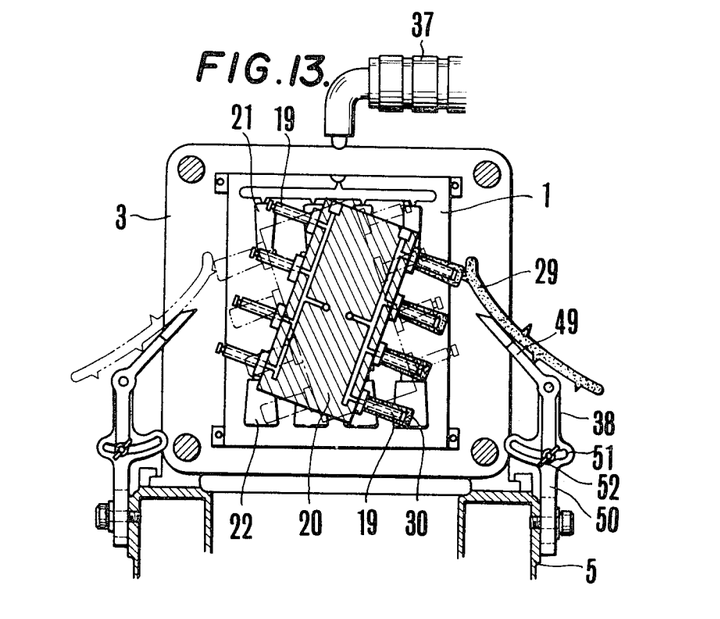
FIG. 13 is a longitudinal sectional view similar to FIG. 12 showing a manner in which the sprue runner is cut and removed according to the rotation of the mold base.

Each of the above descriptions are made on the device in which the separble female molds are opened and closed. In FIGS. 12 and 13 is shown a metal mold provided with a pair of remover 38, which can remove the sprue runner 39 produced by the injection mold automatically with the rotation of the male mold mounting base 20. The remover 38a is comprised of an inclined cutter 49 which is pivoted on a supporting plate 50, said cutter being fixed with a wing screw 52 provided at the guide slot 51 of the supporting plate. The removers are disposed on both sides of the separable female molds 1, 2, and are screwed on both sides of the machine base 5 between the mold mounting plates 3, 4 through supporting plates 50 in such a manner that tip ends of the cutters are directed inwardly. In the case where the device is equipped with such remover 38a, 38a, by shifting the male molds 19, 19 from the injection molding cavities 21 to the blow molding cavities 22, the sprue runner 39 is removed by the cutter 49 as shown in FIG. 12.

In the example shown, the injection heating cylinder 37 is arranged at the upper portion and the removers 38, 38 at the lower portion of the metal mold, but it will be understood that the arrangement of said injection heating cylinder and the removers may also be changed to the sides of the metal mold, and is not limited to the sole arrangement.

I claim:

1. An injection blow molding device comprising a pair of mold mounting plates, each provided with separable half female portions coactable to form separable female molds including both injection molding cavities and blow molding cavities on confronting sides of the mold mounting plates, said injection and blow molding cavities being disposed at 180° to one another and defining respectively injection molds and blow molds, opening and closing mechanism for said female mold portions operable for simultaneous movement of said half female mold portions to mold open and closed positions, a rotatable shaft mounted oppositely to said opening and closing mechanism and movably disposed in one said mold mounting plate at the central portion of the separable female molds, male molds corresponding in number and disposition to said female molds mounted on said rotatable shaft, said shaft being operable for shifting said male molds along the parting line of said separable female molds, and a rotating member on said rotatable shaft operable for rotating said male molds 180° from said injection mold cavities to said blow molding cavities when said separable female molds are open, said female mold opening and closing mechanism including a pair of rams, a cylindrical block slidably internally housing said rams, said rams being actuatable in opposite directions, an actuating plate, a plurality of shafts connecting said actuating plate and an outer said mold mounting plate and slidably supporting an inner said mold mounting plate on an intermediate said shaft, one of said rams being connected with the inner mold mounting plate and the other of said rams being connected with the actuating plate, whereby the pair of the mold mounting plates are operated for uniform opening and closing of the separable female molds, said shaft being movable in axial direction, a crank arm provided between the slidable mold mounting plate connected to the opening mechanism of the female molds and a transferable support base for the rotating shaft, said rotating shaft being movable through said crank arm when the mold mounting plate is operated for moving the male mold between separated female molds.

2. A device as claimed in claim 1, wherein the members for rotating the rotating shaft at the separation of the separable female molds comprise a rack operable by oil pressure and a pinion mounted on the rotating shaft.

3. A device as claimed in claim 2, wherein a single injection nozzle is movably mounted for forwardly and backwardly positioning on the parting line of the separable female mold.

4. A device as claimed in claim 3, wherein an injection heating cylinder is arranged in parallel with the rotating shaft disposed at the central portion of the separable female molds, the female mold opening mechanism being arranged offset at the side of the injection molding cavities.

5. A device as claimed in claim 4, wherein cutters for removing sprue runners at the rotation of the male molds are arranged at the sides of the separable female molds.

References Cited

UNITED STATES PATENTS

| 2,853,736 | 9/1958 | Gussoni | 18—5B |
| Re. 26,265 | 9/1967 | Farkas | 18—5B |
| 3,100,913 | 8/1963 | De Matteo | 18—5B |
| 3,441,982 | 5/1969 | Sagara et al. | 18—5B |

FOREIGN PATENTS 225,409  6/1962  Austria.

H. A. KILBY, JR., Primary Examiner

U.S. Cl. X.R.
264—97